Patented May 17, 1932

1,859,206

UNITED STATES PATENT OFFICE

MABEL KNEPPER HEISLER, OF ORWIGSBURG, PENNSYLVANIA

FOOD CONFECTION

No Drawing.  Application filed March 13, 1930. Serial No. 435,643.

This invention relates to improvements in food products and process of making the same.

An object of the invention is to produce a new and improved food product which will be nutritious, pleasant to the taste and can be economically produced.

A further object is to provide a food product which is in convenient form for storage and shipment.

A further object is to provide a food product which will retain for a considerable period of time its freshness, flavor and edible qualities.

In carrying out my invention I preferably treat flaxseed with peanut butter, or flaxseed may be employed alone in connection with a crystallized shell containing sugar as a main ingredient, whereby the nutritious factors of the flaxseed are sealed in a single unitary food confection which will not deteriorate under adverse atmospheric conditions.

In one embodiment of my invention I pulverize the flaxseed which has been previously freed of dust and chaff. This pulverized flaxseed product constitutes the filling or core of the completed product.

In further carrying out the invention I provide a frosting, coating or shell composed of white sugar, cream of tartar, sassafras oil, and water boiled without stirring until when dropped in cold water it crystallizes and becomes hard and brittle.

Preferably, confectioner's molds are used to apply the above described sugar coating in liquid form to the filling or core of flaxseed.

A modified form of the food product consists in forming the filling or core of ground flaxseed mixed with an equal proportion of peanut butter by measure.

In a specific embodiment of the invention I use the following materials in the proportions specified.

Filling or core

One cupful of ground flaxseed
One cupful of peanut butter
Mix together thoroughly to the consistency of a thick paste.

Frosting, coating or shell

2½ pounds of white sugar
1½ cups of hot water
¼ teaspoon of cream of tartar
6 drops sassafras oil, or teaberry oil
3 drops of coloring (any desired edible coloring).

The coating materials as above enumerated are poured into preferably a granite stew pan and stirred together and placed on a fire and heated gradually to the boiling point. Boiling is continued without stirring until when the product is tried in cold water it crystallizes and becomes hard and brittle.

Confectioner's molds are then used preferably to apply this coating to the above described core of ground flaxseed and peanut butter to produce frosted or coated wafers, drops, bars or the like.

It will be seen that the nutritive values inherent in the flaxseed and peanut butter are thus hermetically sealed in the sugar coating or shell so as to be indefinitely preserved against deterioration.

It will also be seen that the food confection product will be highly palatable to the taste. It will be specifically noted that the oily characteristic of the flaxseed nullifies the disagreeable tendency of the peanut butter to stick to the roof of the mouth.

I do not limit my invention to the precise steps above described as many modifications within the scope of the appended claim may be made without departing from the spirit of my invention.

Having thus described the invention, I claim:

A food confection comprising equal parts of ground flaxseed and peanut butter mixed together to constitute a filling, said filling being hermetically sealed in a shell composed of white sugar, cream of tartar and sassafras oil, the product being characterized by the oily characteristic of the flaxseed nullifying the disagreeable tendency of the peanut butter to stick to the mouth.

In testimony whereof I affix my signature.

MABEL KNEPPER HEISLER. [L. S.]